US005126643A

United States Patent [19]

French

[11] Patent Number: 5,126,643

[45] Date of Patent: Jun. 30, 1992

[54] CONTROL SYSTEM FOR HOLE CUTTING MACHINES

[75] Inventor: Edward M. French, Almondbury, England

[73] Assignee: Rotabroach Limited, Sheffield, England

[21] Appl. No.: 720,094

[22] Filed: Jun. 24, 1991

[51] Int. Cl.[5] ........................ B23B 45/02; H01H 35/14

[52] U.S. Cl. ........................................ 318/434; 361/31; 307/119; 307/142

[58] Field of Search ................ 318/434; 307/116, 119, 307/139, 140, 142; 408/6, 11, 76; 361/24, 30, 31

[56] References Cited

U.S. PATENT DOCUMENTS

| | | | |
|---|---|---|---|
| 4,013,895 | 3/1977 | Akiyoshi et al. | 307/126 |
| 4,105,899 | 8/1978 | Velosa | 307/115 |
| 4,208,555 | 6/1980 | Ikeda et al. | 200/52 R |
| 5,035,547 | 7/1991 | Shoji | 408/6 |

*Primary Examiner*—Bentsu Ro

*Attorney, Agent, or Firm*—Dykema Gossett

[57] ABSTRACT

A control system for an electric-motor-driven power tool, comprising solenoid operated switching contacts in a mains supply circuit for controlling the supply of mains current to the motor, a latching circuit for normally holding said switching contacts closed during normal operation, a stop switch for breaking the latching circuit to open said switching contacts when it is desired to stop the motor in normal operation, and a reed relay having switching contacts disposed in the latching circuit and a coil disposed in the mains supply circuit to the motor. The reed relay is arranged to break the latching circuit automatically, and thereby disable the motor, if the current supply to the motor exceeds a predetermined level. A movement detection device is adapted to trigger the latching circuit to open the solenoid operated switching contacts in the event of the control system being physically moved in operation.

15 Claims, 3 Drawing Sheets

CONTROL SYSTEM FOR HOLE CUTTING MACHINES

The present invention is concerned with a control system for a hole cutting machine of the type based on a universal electrical motor such as those used in portable electric drills.

The invention is particularly applicable to a portable, annular hole cutting machine which uses an electromagnet to locate the machine frame on a metal workpiece in which a hole is to be made. The frame of the machine has a linear track along which an electric motor can be moved by a manually operated capstan, the motor being coupled to an annular cutting tool via a chuck which is rotatably mounted on the frame in rotary bearings. The frame carries the electromagnet which is designed and configured so as to firmly locate the motor and cutting tool relative to the workpiece.

One problem in such a machine is to ensure that the motor is disabled instantly in the case of motor overload, i.e. in the event that the motor draws excessive current.

A second problem is to ensure that the supply to the motor is disabled in the event that the machine frame should slip relative to the workpiece during use.

In accordance with the present invention there is provided a control system for an electric-motor-driven power tool, comprising solenoid operated switching contacts in a mains supply circuit for controlling the supply of mains current to the motor, a latching circuit for normally holding said switching contacts closed during normal operation, a stop switch for breaking the latching circuit to open said switching contacts when it is desired to stop the motor in normal operation, and reed relay means having switching contacts disposed in said latching circuit and a coil disposed in the mains supply circuit to the motor, the reed relay means being adapted to break the latching circuit automatically, and thereby disable the motor, if the current supply to the motor exceeds a predetermined level.

Conveniently, the mains supply circuit to the motor comprises live and neutral lines containing respective ones of said solenoid operated switching contacts, said coil of said reed relay means being located in said live line.

Preferably, the control system includes a start switch and first, second and third relay coils in a series circuit with said stop switch, the first relay coil having associated relay contacts in series with the switching contacts of said reed relay means, the latter series connection being disposed in parallel with said start switch to provide said latching circuit, and the second and third relay coils controlling respectively said solenoid operated switching contacts in said mains supply circuit.

Preferably, the control system includes a movement detection means disposed in parallel with said first relay coil such that, in the event of it being actuated, the movement detection means shorts out said first relay coil and causes the latching circuit to be broken and the motor to be de-energised.

The invention also provides an electric motor driven hole cutting machine, comprising a frame, an electric motor mounted in said frame and adapted to drive a cutting tool, solenoid operated switching contacts in a mains supply circuit for controlling the supply of mains current to the motor, a latching circuit for normally holding said switching contacts closed during normal operation, a stop switch for breaking the latching circuit to open said switching contacts when it is desired to stop the motor in normal operation, reed relay means having switching contacts disposed in said latching circuit and a coil disposed in the mains supply circuit to the motor, the reed relay means being adapted to break the latching circuit automatically, and thereby disable the motor, if the current supply to the motor exceeds a predetermined level, rectifier means coupled to said mains supply circuit, and electromagnetic clamping means by which said frame can be electromagnetically clamped to a workpiece.

The invention is described further hereinafter, by way of example only, with reference to the accompanying drawings, in which.

Figure 1:
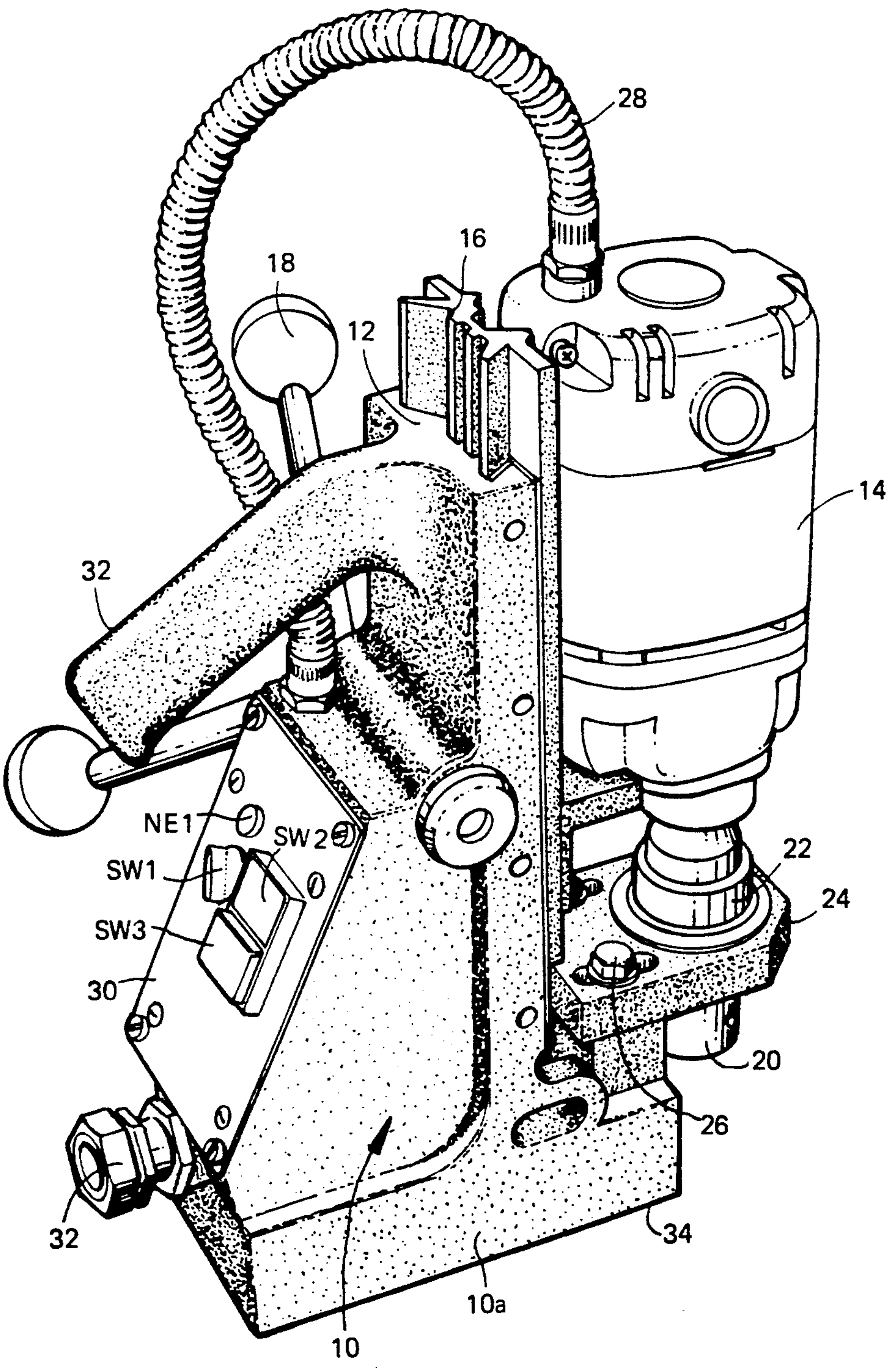
FIG. 1 is a perspective view of one embodiment of an annular hole cutter to which the present invention is applicable.
Figure 2:
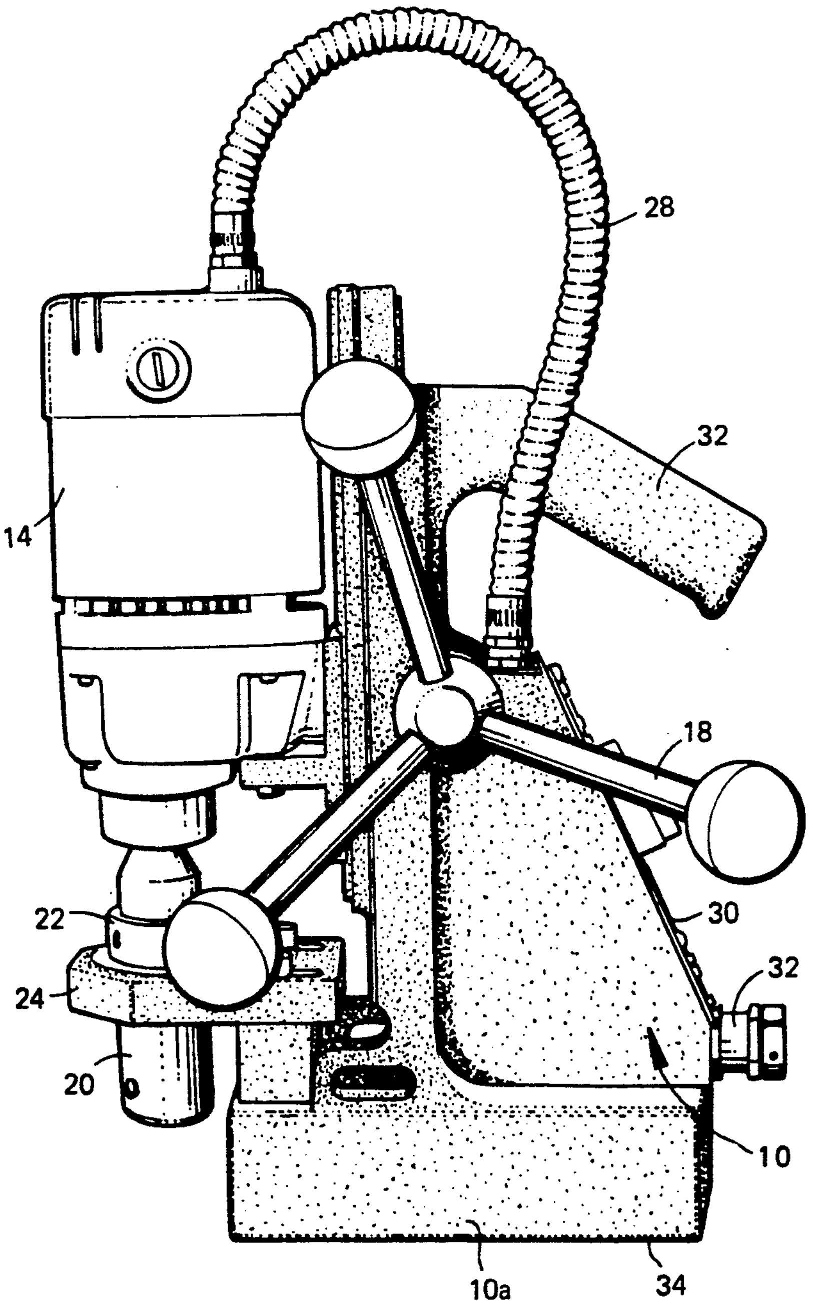
FIG. 2 is a side elevation of the annular hole cutter of FIG. 1.

Referring first to FIGS. 1 and 2, the illustrated example of an annular hole cutting machine comprises a frame 10 which defines a linear track 12 on which an electric motor 14 is longitudinally displaceable by means of a carriage 16. The carriage 16 can be moved in both directions along the track 12 by means of a manual capstan 18 and an internal rack and pinion arrangement (not visible in FIGS. 1 and 2). The motor spindle is coupled to an annular cutting tool 20 by way of a chuck 22 which is mounted in rotary bearings in a plate member 24, rigidly attached by bolts 26 to the machine frame 10. The plate member 24 allows longitudinal displacement of the chuck and tool whilst providing lateral support and guidance. Electrical power to the motor 14 is supplied, via a flexible cable 28, from a control system housed within the frame 10. Control buttons/switches for the control system are located on an inclined panel 30 disposed beneath a handle 32. Mains input is supplied to the control system via an inlet bushing 33.

Disposed within a generally rectangular cuboidal part 10*a* of the frame is an electromagnet arrangement which normally includes several individual electromagnet coils (not visible in FIGS. 1 and 2). When energised, these electromagnets are effective to hold the flat underside surface 34 of the housing part 10*a* against a metal workpiece (not shown) in which a hole is to be made.

Figure 3:
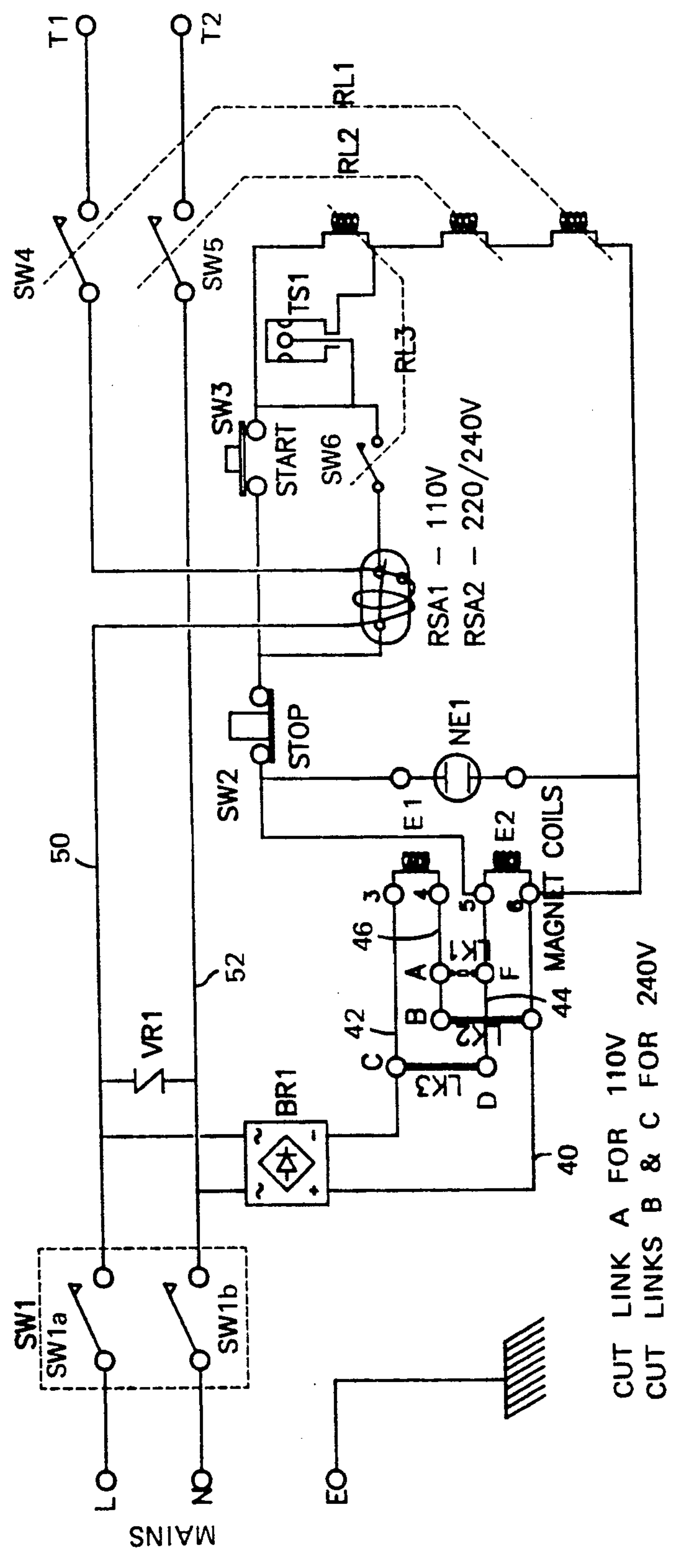
FIG. 3 is a circuit diagram of a control system incorporating several aspects of the present invention.

The control system is now described with reference to FIG. 3.

Mains input is applied to terminals L, N and a single phase supply for the motor 14 is extracted via lines 50, 52 and terminals T1, T2. Mains input terminal L is connected to motor supply terminal T1 via first switching contacts SW1*a* of the rotary two-pole isolator switch SW1, the coil of a reed relay RSA, and the switching contacts SW4 of a first relay RL1. Mains input terminal N is connected to motor supply terminal T2 via second switching contacts SW1*b* of the rotary two-pole isolator switch SW1 and via the switching contacts SW5 of a second relay RL2.

Downstream of the isolator SW1, the mains input terminals L, N are also connected, to a full-wave rectifier BR1 the positive DC+ output of which is connected by a line 40 to a terminal 6 and the negative DC− output of which is connected by a line 42 to a terminal 3. Connected between the terminal 3 and a terminal 4 is the coil E1 of a first electromagnet and connected between the terminal 6 and a terminal 5 is the coil E2 of a second electromagnet. The line 42 contains a terminal C which is connected to a terminal D by a removable link LK3. The terminal D is connected to the terminal 5 by a line 44 containing a terminal F, which is coupled to a further terminal A by way of a second removable link LK1. Terminal A is disposed in a line 46 connecting terminal 4 to a terminal B. The terminal B is connected to the terminal G by way of a further removable link LK2.

Terminal 5 is connected to one side of a main motor stop switch SW2, the other side of which is connected firstly to one side of a main motor start switch SW3 and secondly to one side of the switching contact of the reed relay RSA. The other side of the reed relay is connected, via the switching contacts SW6 of a further relay RL3, to the other side of the start switch SW3 and to one terminal of a movement detector device TS1. This other side of the start switch SW3 is also connected to one side of the coil of relay RL3. The other side of relay RL3 is connected firstly to the second terminal of the movement detector TS1 and secondly to one side of the coil of the relay RL2. The other side of the coil of relay RL2 is connected to one side of the coil of the relay RL1, the other side of which is connected to terminal 6. A neon lamp NE1 is connected across the DC supply provided between terminals 5 and 6.

For 110 V operation, link LK1 is cut and links LK2 and LK3 remain. For 240 V operation, links LK2 and LK3 are cut and link LK1 remains.

The motor is typically an 800 watt heavy duty universal motor.

The detector TS1 is an inertial motion sensitive switch which provides a momentary short circuit of its terminals in the event of the switch being moved. As described hereinafter, this shorting action is used to stop the motor supply in the event of displacement of the machine frame during operation, e.g. in the event of a sudden snatch movement if the electromagnetic clamps should fail.

The abovedescribed control system operates as follows.

In use, the frame 10 is positioned so that its undersurface 34 lies on a (metal) workpiece (not shown). Until the electromagnet clamp is energised, the frame can be freely moved on the workpiece. When the frame has been correctly positioned, the rotary switch SW1 is turned so as to close contacts SW1*a*, SW1*b*. Power is thereby connected to the lines 50, 52 but cannot reach the motor yet as switching contacts SW4, SW5 are open. Power is also supplied to the rectifier BR1 and, depending on which of the links LK1, LK2, LK3 remain, the electromagnet coils E1, E2 are energised. In the event that link LK1 is cut and links LK2, LK3 remain, the d.c. supply from the rectifier is applied to the coils E1 and E2 in parallel for 110 V a.c. operation. On the other hand, when link LK2 and LK3 are cut and link LK1 remains, the d.c. supply is applied to the coils E1 and E2 in series, for 240 V a.c. operation. Energisation of the coils E1, E2 rigidly clamps the frame 10 to the workpiece in its operation position.

By virtue of the aforegoing arrangement of the links and coils, whichever mains supply is used (with the appropriate links cut), a d.c. voltage of approximately 110–120 V is present on the terminal 5. Operation of the START button SW3 will then connect this latter d.c. voltage to the coils of all three relays RL1, RL2, RL3 whereby the switching contacts SW4, SW5 are closed to connect the mains supply to the motor 14 via the terminals T1, T2. Furthermore, the switching contact SW6 is closed whereby to bridge the START switch SW3 and latch on the supply to the motor. It will be noted that the latching current is obtained via the normally closed reed contacts of the reed relay RSA. Normal stopping of the motor is achieved by actuation of the STOP button SW2 which breaks the circuit to the relays RL1, RL2, RL3 and hence to the latch.

A principal feature of the present control system is its ability to detect in a simple manner when the motor current is excessive and to disconnect the motor supply accordingly. This is achieved in that the main supply to the motor passes through the coil of the normally closed reed relay RSA, the arrangement being such that "normal" operating currents for the motor will not open the reed contacts but abnormally high operating currents will do so. Opening of the reed contacts immediately breaks the latch circuit, which opens the switching contacts SW4, SW5 and disables the motor supply.

The point at which the reed contacts open is preselected by an individual setting up procedure for each control system board during assembly of that board. An "electronic jig" is used to apply a repeated ramp current to the reed coil and the instantaneous current at which the reed contacts open is noted electronically. The coil is physically displaced on the reed capsule until the contacts open at a desired pre-selected (motor) current. This position of the coil is then set permanently using a suitable adhesive.

The device TS1 provides additional protection to disable the motor supply in the event that the machine frame should move on the workpiece during operation. Such movement is detected by the movement sensor TS1, actuation of which is effective to short circuit the coil of relay RL1 whereby the latch drops out and the relays RL2, RL1 are de-energised so as to open the switching contacts SW4 SW5.

I claim:

1. A control system for an electric-motor-driven power tool comprising;

- switching means in a mains supply circuit for controlling the supply of mains current to the motor;
- a latching circuit for normally holding said switching means closed during normal operation;
- a stop switch for breaking the latching circuit to open said switching means when it is desired to stop the motor in normal operation; and
- reed and coil assembly means having switching contacts disposed in said latching circuit and a coil disposed in the mains supply circuit to the motor, the reed and coil assembly means being adapted to break the latching circuit automatically, and thereby disable the motor, if the current supply to the motor exceeds a predetermined level.

2. A control system according to claim 1, wherein the mains supply circuit to the motor comprises live and neutral lines containing respective ones of said switching means, said coil of said reed and coil assembly means being located in one said line.

3. A control system according to claim 2, including a start switch and first, second and third relay coils in a series circuit with said stop switch, the first relay coil having associated relay contacts in series with the switching contacts of said reed and coil assembly means, the latter series connection being disposed in parallel with said start switch to provide said latching circuit, and the second and third relay coils controlling respectively said switching means in said mains supply circuit.

4. A control system according to claim 3, including an inertial movement detection means disposed in parallel with said first relay coil such that, in the event of it being actuated, the movement detection means shorts out said first relay coil and causes the latching circuit to be broken and the motor to be de-energised.

5. A control system for an electric-motor-driven power tool comprising;

solenoid operated switching contacts in a mains supply circuit for controlling the supply of mains current to the motor;

a latching circuit for normally holding said switching contacts closed during normal operation;

a stop switch for breaking the latching circuit to open said switching contacts when it is desired to stop the motor in normal operation; and reed and coil assembly means having switching contacts disposed in said latching circuit and a coil disposed in the mains supply circuit to the motor, the reed and coil assembly means being adapted to break the latching circuit automatically, and thereby disable the motor, if the current supply to the motor exceeds a predetermined level.

6. A control system for an electric-motor-driven power tool, comprising;

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation;

reed and coil assembly means having switching contacts disposed in said latching circuit and a coil disposed in the mains supply circuit to the motor, the reed and coil assembly means being adapted to break the latching circuit automatically, and thereby disable the motor, if the current supply to the motor exceeds a predetermined level; and movement detection means adapted to trigger said latching circuit to open said switching means in the event of the control system being physically moved in operation.

7. A control system for an electric-motor-driven power tool, comprising;

solenoid operated switching contacts in a mains supply circuit for controlling the supply of mains current to the motor;

a latching circuit for normally holding said switching contacts closed during normal operation;

a stop switch for breaking the latching circuit to open said switching contacts when it is desired to stop the motor in normal operation;

reed and coil assembly means having switching contacts disposed in said latching circuit and a coil disposed in the mains supply circuit to the motor, the reed and coil assembly means being adapted to break the latching circuit automatically, and thereby disable the motor, if the current supply to the motor exceeds a predetermined level; and inertial movement detection means adapted to trigger said latching circuit to open said solenoid operated switching contacts in the event of the control system being physically moved in operation.

8. An electric motor driven hole cutting machine comprising an electric motor adapted to drive a hole cutting tool, comprising:

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation; and reed and coil assembly means having switching contacts disposed in said latching circuit and a coil disposed in the mains supply circuit to the motor, the reed and coil assembly means being adapted to break the latching circuit automatically and thereby disable the motor, if the current supply to the motor exceeds a predetermined level.

9. An electric motor driven hole cutting machine, comprising a frame;

an electric motor mounted in said frame and adapted to drive a hole cutting tool;

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation;

reed and coil assembly means having switching contacts disposed in said latching circuit and a coil disposed in the mains supply circuit to the motor, the reed and coil assembly means being adapted to break the latching circuit automatically, and thereby disable the motor, if the current supply to the motor exceeds a predetermined level; and electromagnetic clamping means by which said frame can be electromagnetically clamped to a workpiece.

10. A machine according to claim 9, wherein the electromagnetic clamping means comprises two electromagnetic coils which can be selectively connected in series or parallel by removable link means whereby to provide at their junction a fixed d.c. supply voltage whose voltage remains substantially the same irrespective of whether the main supply is 110 V or 220 V, merely by selection of the removable links.

11. A control system for an electric-motor-driven power tool comprising:

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation; and inertial movement detection means adapted to trigger said latching circuit to open said switching means in the event of the control system being physically moved in operation.

12. An electric motor driven hole cutting machine, comprising a frame;

an electric motor mounted in said frame and adapted to drive a hole cutting tool;

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation;

electromagnetic clamping means by which said frame can be electromagnetically clamped to a workpiece, and inertial movement detection means adapted to trigger said latching circuit to open said switching means in the event of the cutting machine being physically moved in operation.

13. An electric-motor-driven power tool, comprising a frame;

an electric motor mounted in said frame and adapted to drive a tool;

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation;

electromagnetic clamping means by which said frame can be electromagnetically clamped to a workpiece, and inertial movement detection means adapted to trigger said latching circuit to open said switching means in the event of the power tool being physically moved in operation.

14. A power tool according to claim 13, wherein the electromagnetic clamping means comprises two electromagnetic coils which can be selectively connected in series or parallel by removable link means whereby to provide at their junction a fixed d.c. supply voltage whose voltage remains substantially the same irrespective of whether the main supply is 110 V or 220 V, merely by selection of the removable link means.

15. An electric-motor-driven power tool, comprising a frame;

an electric motor mounted in said frame and adapted to drive a tool;

switching means in a mains supply circuit for controlling the supply of mains current to the motor;

a latching circuit for normally holding said switching means closed during normal operation;

a stop switch for breaking the latching circuit to open said switching means when it is desired to stop the motor in normal operation; and electromagnetic clamping means by which said frame can be electromagnetically clamped to a workpiece, the electromagnetic clamping means comprising two electromagnetic coils which can be selectively connected in series or parallel by removable link means whereby to provide at their junction a fixed d.c. supply voltage whose voltage remains substantially the same irrespective of whether the main supply is 110 V or 220 V, merely by selection of the removable link means.

* * * * *